(12) United States Patent  (10) Patent No.: US 7,957,999 B2
Stoxen et al.  (45) Date of Patent: Jun. 7, 2011

(54) ELECTRONIC ACQUISITION SYSTEM AND METHOD

(75) Inventors: Paul Stoxen, Phoenix, AZ (US);
Christina Chow, Phoenix, AZ (US);
Can Demirkaya, Peoria, AZ (US);
Manoj K. Kejriwal, Pune (IN)

(73) Assignee: American Express Travel Related Services Company, Inc., New York, NY (US)

( * ) Notice: Subject to any disclaimer, the term of this patent is extended or adjusted under 35 U.S.C. 154(b) by 1383 days.

(21) Appl. No.: 10/071,615

(22) Filed: Feb. 5, 2002

(65) Prior Publication Data

US 2002/0152106 A1   Oct. 17, 2002

Related U.S. Application Data

(60) Provisional application No. 60/268,656, filed on Feb. 14, 2001, provisional application No. 60/268,538, filed on Feb. 13, 2001.

(51) Int. Cl.
*G06Q 10/00* (2006.01)

(52) U.S. Cl. .......................................... 705/7.15; 705/35

(58) Field of Classification Search ................... 705/8, 9
See application file for complete search history.

(56) References Cited

U.S. PATENT DOCUMENTS

| | | |
|---|---|---|
| 4,694,397 A | 9/1987 | Grant et al. |
| 4,751,640 A | 6/1988 | Lucas et al. |
| 4,823,265 A | 4/1989 | Nelson |
| 4,992,940 A | 2/1991 | Dworkin |
| 5,220,501 A | 6/1993 | Lawlor et al. |
| 5,239,462 A | 8/1993 | Jones et al. |
| 5,262,942 A | 11/1993 | Earle |
| 5,274,547 A | 12/1993 | Zoffel et al. |
| 5,463,555 A | 10/1995 | Ward et al. |
| 5,611,052 A | 3/1997 | Dykstra et al. |
| 5,615,408 A | 3/1997 | Johnson et al. |
| 5,677,955 A | 10/1997 | Doggett et al. |
| 5,694,551 A | 12/1997 | Doyle et al. |
| 5,696,907 A | 12/1997 | Tom |
| 5,706,442 A | 1/1998 | Anderson et al. |
| 5,710,889 A | 1/1998 | Clark et al. |
| 5,745,706 A | 4/1998 | Wolfberg et al. |
| 5,758,327 A | 5/1998 | Gardner et al. |
| 5,758,329 A | 5/1998 | Wojcik et al. |
| 5,765,142 A | 6/1998 | Allred et al. |
| 5,774,882 A | 6/1998 | Keen et al. |
| 5,787,404 A | 7/1998 | Fernandez-Holmann |
| 5,797,133 A | 8/1998 | Jones et al. |
| 5,842,178 A | 11/1998 | Giovannoli |
| 5,866,889 A | 2/1999 | Weiss et al. |
| 5,870,721 A | 2/1999 | Norris |

(Continued)

OTHER PUBLICATIONS

"The American Express Cards", Dec. 24, 1996 webpages from web.archive.org, pp. 1-4.*

(Continued)

*Primary Examiner* — Jonathan G Sterrett
(74) *Attorney, Agent, or Firm* — Snell & Wilmer L.L.P.

(57) ABSTRACT

A system and method providing a centralized acquisition utility for facilitating event requests for multiple client products and/or services, where a dispatcher forwards event requests to one or more handlers to apply client business logic to process and fulfill said request. The handlers further employ task-specific workers for facilitating the individual steps required to complete the process.

20 Claims, 3 Drawing Sheets

U.S. PATENT DOCUMENTS

| | | | |
|---|---|---|---|
| 5,878,403 | A | 3/1999 | DeFrancesco et al. |
| 5,890,140 | A | 3/1999 | Clark et al. |
| 5,893,076 | A | 4/1999 | Hafner et al. |
| 5,899,982 | A | 5/1999 | Randle |
| 5,913,202 | A | 6/1999 | Motoyama |
| 5,918,217 | A | 6/1999 | Maggioncalda et al. |
| 5,930,776 | A | 7/1999 | Dykstra et al. |
| 5,950,179 | A | 9/1999 | Buchanan et al. |
| 5,970,475 | A | 10/1999 | Barnes et al. |
| 5,970,476 | A | 10/1999 | Fahey |
| 5,974,395 | A | 10/1999 | Bellini et al. |
| 5,991,750 | A | 11/1999 | Watson |
| 6,009,406 | A | 12/1999 | Nick |
| 6,014,045 | A * | 1/2000 | Behzad ............... 327/89 |
| 6,014,644 | A | 1/2000 | Erickson |
| 6,014,645 | A | 1/2000 | Cunningham |
| 6,018,723 | A | 1/2000 | Siegel et al. |
| 6,029,147 | A | 2/2000 | Horadan et al. |
| 6,029,149 | A | 2/2000 | Dykstra et al. |
| 6,032,184 | A * | 2/2000 | Cogger et al. ........ 709/223 |
| 6,044,354 | A | 3/2000 | Asplen, Jr. |
| 6,055,516 | A | 4/2000 | Johnson et al. |
| 6,064,986 | A | 5/2000 | Edelman |
| 6,070,142 | A * | 5/2000 | McDonough et al. ........ 705/7 |
| 6,088,686 | A | 7/2000 | Walker et al. |
| 6,105,007 | A | 8/2000 | Norris |
| 6,112,190 | A | 8/2000 | Fletcher et al. |
| 6,115,690 | A | 9/2000 | Wong |
| 6,119,104 | A | 9/2000 | Brumbelow et al. |
| 6,125,391 | A | 9/2000 | Meltzer et al. |
| 6,128,602 | A | 10/2000 | Northington et al. |
| 6,128,624 | A | 10/2000 | Papierniak et al. |
| 6,131,810 | A | 10/2000 | Weiss et al. |
| 6,135,349 | A | 10/2000 | Zirkel |
| 6,141,647 | A | 10/2000 | Meijer et al. |
| 6,151,588 | A | 11/2000 | Tozzoli et al. |
| 6,154,729 | A | 11/2000 | Cannon et al. |
| 6,163,771 | A | 12/2000 | Walker et al. |
| 6,272,528 | B1 * | 8/2001 | Cullen et al. ........ 705/36 R |
| 6,370,573 | B1 * | 4/2002 | Bowman-Amuah ........ 709/223 |
| 6,385,594 | B1 * | 5/2002 | Lebda et al. ........ 705/38 |
| 6,389,426 | B1 * | 5/2002 | Turnbull et al. ........ 707/102 |
| 6,513,129 | B1 * | 1/2003 | Tentij et al. ........ 714/4 |
| 6,571,285 | B1 * | 5/2003 | Groath et al. ........ 709/223 |
| 6,629,135 | B1 | 9/2003 | Ross, Jr. et al. |
| 6,941,306 | B2 | 9/2005 | Kim |
| 7,370,335 | B1 | 5/2008 | White et al. |
| 7,464,057 | B2 | 12/2008 | Cole et al. |
| 2001/0044840 | A1 * | 11/2001 | Carleton ........ 709/223 |
| 2002/0103905 | A1 | 8/2002 | Subramaniam |
| 2002/0152106 | A1 | 10/2002 | Stoxen et al. |
| 2002/0165936 | A1 | 11/2002 | Alston et al. |
| 2002/0169851 | A1 | 11/2002 | Weathersby et al. |
| 2002/0178213 | A1 | 11/2002 | Parry |
| 2003/0200300 | A1 | 10/2003 | Melchione |
| 2004/0133460 | A1 | 7/2004 | Berlin et al. |
| 2005/0015481 | A1 | 1/2005 | Blankenship |

OTHER PUBLICATIONS

Essex, David, "Big Dreams for tiny money", Dec 13, 1999, ComputerWorld, Framingham, vol. 33, Iss. 50, p. 66, 1pgs, ProQuest ID 47371441.*

Schatz, Amy; "Credit card companies offer special plastic for buying on the web", Dec 19, 1999, Austin American Statesman, p. E1, ProQuest ID 47331600.*

Cultivating customer loyalty, Communications News, v 36, n 6, p. 56, Jun. 1999, Dialog 07044866 Supplier No. 57769200.*

CardSystems and Maverick International Processing Services Merge to Form Next-Generation Application Service Provider. Business Wire, p. 0047, Oct. 5, 1999, Dialog 06693480 Supplier No. 55993027.*

First Data, Netscape Jointly Deliver "First Real-Time On-Line Credit Card Authorisation System" Computergram International, n 2890, p. N/A, Apr. 11, 1996, Dialog 04296220 Supplier No. 46296433.*

Internet Initiatives Loom Large for Serious Card Marketers, Card Marketing, v 3, n 11, p. 1+, Dec. 1999, Dialog 02033896 Supplier No. 25515328.*

American Express Enhances Membership B@nking With Free Quicken TurboTax Deluxe, 5.65% APY Money Market Rates, No-Fee Interest Checking, PR Newswire. New York: Feb 1, 2000. p. 1.*

AmEx beefs up online investment services, Funds International. London: Nov 25, 1999. p. 4.*

American Express Launches Online Brokerage, PR Newswire. New York: Nov 8, 1999. p. 1.*

The search for the 'killer app', Hal Lux. Institutional Investor. New York: Apr. 1997. vol. 31, Iss. 4; p. 91.*

Fearn et al. ("Designing Tivoli Solutions for End-to-End Systems and Service Management", Jun. 1999).*

"The World Wide Web as enabling technology for CSCW: The case of BSCW", R Bentley, T Horstmann, J Trevor—Computer Supported Cooperative . . . , 1997—Springer.*

Recognizing and supporting roles in CSCWgatech.edu [PDF] M Guzdial, J Rick, B Kerimbaev - . . . of the 2000 ACM conference on . . . , 2000—portal.acm.org.*

Workflow from within and without: Technology and cooperative work on the print . . . psu.edu [PDF] J Bowers, G Button, W Sharrock—Proceedings of the fourth . . . , 1995—portal.acm.org.*

Agent-based workflow: TRP support environment (TSE) JW Chang, CT Scott—Computer Networks and ISDN Systems, 1996—Elsevier.*

Supporting cooperation in the SPADE-1 environment S Bandinelli, E Di Nitto, A . . . .—IEEE Transactions . . . , 1996—doi.ieeecomputersociety.org.*

USPTO; Advisory Action dated Apr. 2, 2010 in U.S. Appl. No. 10/718,004.

USPTO; Final Office Action dated Feb. 22, 2010 in U.S. Appl. No. 10/718,004.

USPTO; Office Action dated Oct. 14, 2009 in U.S. Appl. No. 10/718,004.

USPTO; Advisory Action dated Jul. 9, 2009 in U.S. Appl. No. 10/718,004.

USPTO; Office Action dated Mar. 19, 2009 in U.S. Appl. No. 10/718,004.

USPTO; Office Action dated Aug. 20, 2008 in U.S. Appl. No. 10/718,004.

USPTO; Office Action dated Jan. 17, 2008 in U.S. Appl. No. 10/718,004.

USPTO; Final Office Action dated Nov. 10, 2010 in U.S. Appl. No. 11/275,066.

USPTO; Office Action dated Aug. 5, 2010 in U.S. Appl. No. 11/275,066.

www.gmcard.com Printed from the internet Nov. 30, 2005.
www.starbucks.com/card/duetto.asp printed from the internet Nov. 30, 2005.

* cited by examiner

ELECTRONIC ACQUISITION SYSTEM AND METHOD

CROSS REFERENCE TO RELATED APPLICATIONS

This application claims priority to, and the benefit of, U.S. Provisional Application Ser. No. 60/268,538, filed on Feb. 13, 2001 and U.S. Provisional Application Ser. No. 60/268,656, filed Feb. 14, 2001, both of which are hereby incorporated by reference.

FIELD OF INVENTION

The present invention relates generally to a system and method to facilitate the real-time product application process for multiple clients, and more particularly, to an electronic product acquisition and credit bureau interface platform that is configurable, depending on clients' needs, to capture and process data from applicants; provide real-time screening and profiling; enable real-time credit decisioning, and/or provide real-time product or service fulfillment.

BACKGROUND OF THE INVENTION

Many investment, financial, or general service companies offer customers a variety of different products and services. For example, companies such as American Express, Chase, Schwab, AT&T, and/or the like typically offer customers a multitude of products or services, such as financial planning services; credit or charge card products, savings and checking accounts; travel services; reward programs; telephone accounts, utility accounts, internet services, cable services, online brokerage accounts, etc. Many of these products or services are provided by various business groups within the company; while many other products or services may be provided by subsidiaries, third party vendors or contractors. To facilitate the application process for each of these products and/or services, an application processing infrastructure is needed. Typically, each business group, vendor, etc. (collectively referred to herein as the "client") is responsible for creating and managing the infrastructure for its own product. For example, a company's credit card product infrastructure may be operated and maintained by the company's credit card business group, while the company's investment products and services infrastructure may be operated and maintained by a third party trading partner, or perhaps, by an investment services business group. Therefore, companies, through their various "clients" typically maintain separate and distinct application processing infrastructures or platforms for each product or service offered. As can be appreciated, this results in significant infrastructure cost to the company, where redundant infrastructure development, operation and maintenance is typical in new product development and implementation. Also, because of separate, and often incompatible, infrastructure platforms, the customer, desiring more than one product from a given company, is forced to re-apply for each product, typically re-entering previously entered information.

With the advent of the internet, real-time application processing has become prevalent, where the applicant is allowed to apply online over the company's website. Generally, the online application process involves the applicant submitting his application data to the company over the internet. This is typically accomplished by the applicant completing the company's requested online form fields, such as name, address, occupation, social security number, income, and/or the like. The company then receives this information and generally processes this information manually, applying various application criteria, depending on the particular product or service requested, to determine if applicant is approved for the new product or service. If the applicant is approved, an account is normally set-up and the applicant is sent, via regular mail, the product and notification of approval.

Recent developments to online application processing have involved applying online and obtaining a real-time application decision during the same online session. For recent developments in this area, see U.S. Provisional Application, Ser. No. 60/268,658, filed Feb. 14, 2001, and a currently co-pending utility application, entitled Real-time Brokerage Account Application System and Method, filed on Dec. 20, 2001, both of which are hereby incorporated by reference. This real-time application and decisioning process requires additional infrastructure for processing data, formatting data, communicating data to/from various entities such as credit bureaus, and setting up accounts by associating or assigning account numbers, privileges, credit lines, etc to the approved applicant. This infrastructure typically includes, for example, various web servers, application servers, financial capture systems, accounts receivable/payable systems, securities management systems, trading systems, and the like. As previously noted, each client bears the expense for this infrastructure, where each client typically operates and maintains their respective system infrastructure. As such, a problem with existing infrastructure development is that companies, with multiple clients, offering many products and services, have traditionally incurred substantial costs associated with developing, operating and maintaining separate account application processing infrastructure. Similarly, this redundant infrastructure, has also resulted in requiring the applicant to access different sites or submit information more than once when multiple products are desired.

SUMMARY OF THE INVENTION

The present invention is a standardized product and/or service acquisition system and method for providing multiple clients (e.g., business units or third party vendors) with a single multi-use real-time application processing infrastructure (referred to herein as an "E-Acquisition system"). This E-Acquisition system may be configured, according to each particular client needs, to, for example, request, receive, capture, and screen data; obtain a credit decision, if necessary; and/or fulfill product or service requests.

More particularly, the E-Acquisition system reduces the amount of data reentry and processing necessary to fulfill multiple product or service requests. The system facilitates, inter alia, real-time data acquisition (i.e. capturing data and pushing to another system, such as a vendor), real-time decisioning (i.e., capturing data, accessing a credit bureau, retrieving a credit score and applying decision rules to determine if application is approved, denied or deferred), and real-time account generation or fulfillment (i.e., capturing data, acquiring credit bureau decision, and providing applicant with product or service requested). In other words, this invention provides a framework that contemplates three exemplary phases or models of operation: (1) data capture, (2) data processing and decisioning, and (3) fulfillment; where, depending upon a client's requirements, one, two or all three phases are performed by the E-Acquisition system to facilitate the client's application and/or fulfillment needs.

BRIEF DESCRIPTION OF THE DRAWINGS

Additional aspects of the present invention will become evident upon reviewing the non-limiting embodiments

DETAILED DESCRIPTION OF EXEMPLARY EMBODIMENTS

The present invention is a comprehensive and standardized electronic product or service acquisition ("E-Acquisition") system and method providing real-time data capture, data processing/decisioning and/or fulfillment functionality for virtually any type of product or service offered by a company through its various business units, third party vendor or other entity. Business units, third party vendors, business partners, or any other entity desiring a centralized system for fulfilling product or service event requests are collectively referred to throughout as "clients." In other words, this invention is useful for any entity that provides products or services to customers and who therefore require some form of electronic data capture, application processing/decisioning, and/or fulfillment. While some clients, because of existing infrastructure, for example, may only desire limited application processing functionality (e.g., obtain credit decision), others will need full functionality (e.g., capture and process data, obtain credit decision and fulfill product or service request). It should be appreciated that clients who desire electronic acquisition services also require the ability to frequently modify their presentation to the applicant (e.g., web pages). As an integrated E-Acquisition System client, there is generally little, if any, effect on the data capture process for changes to the application pages (i.e., add, remove or modify capture fields).

Multiple clients typically engage the E-Acquisition system to facilitate their various application processing and fulfillment requests. The E-Acquisition system frees the client's system developer from having to deal with web-server to application-server communications. It further provides storage for user-defined XML data, eliminating the need to create and manage a separate relational databases for every new fulfillment system. Also, the E-Acquisition system provides interfaces to commonly used core services (i.e., data storage and retrieval, credit bureau access, security administration, etc. With this system, developers can concentrate on building the business logic required to perform the fulfillment of their specific product or service, rather than building system infrastructure. Therefore, the present invention facilitates the re-use of components by enabling one centralized application processing system to receive product and/or service requests for core services from a number of different clients. This infrastructure consolidation and component re-use saves clients money and, by reducing the need to develop product-specific infrastructure, enables clients to reduce the time to market for new products and services. Indeed, the present invention overcomes unneeded infrastructure redundancy that has plagued larger companies by centralizing the application process in one system, thereby allowing multiple clients to access and utilize a centralized infrastructure for product or service application processing and fulfillment. Accordingly, the electronic acquisition system is a systematic, proven and repeatable process, the advantages of which include: the elimination or reduction in the need for additional acquisition infrastructure (e.g., database development and configuration, dedicated workflow process, dedicated batch process, dedicated reporting, etc.); an improved time-to-market for business units and vendors; reduced acquisition costs for new products and services; minimized support due to the common infrastructure (centralized production support, reusable components, reduced infrastructure and business operation costs); and enhanced availability.

Figure 2:
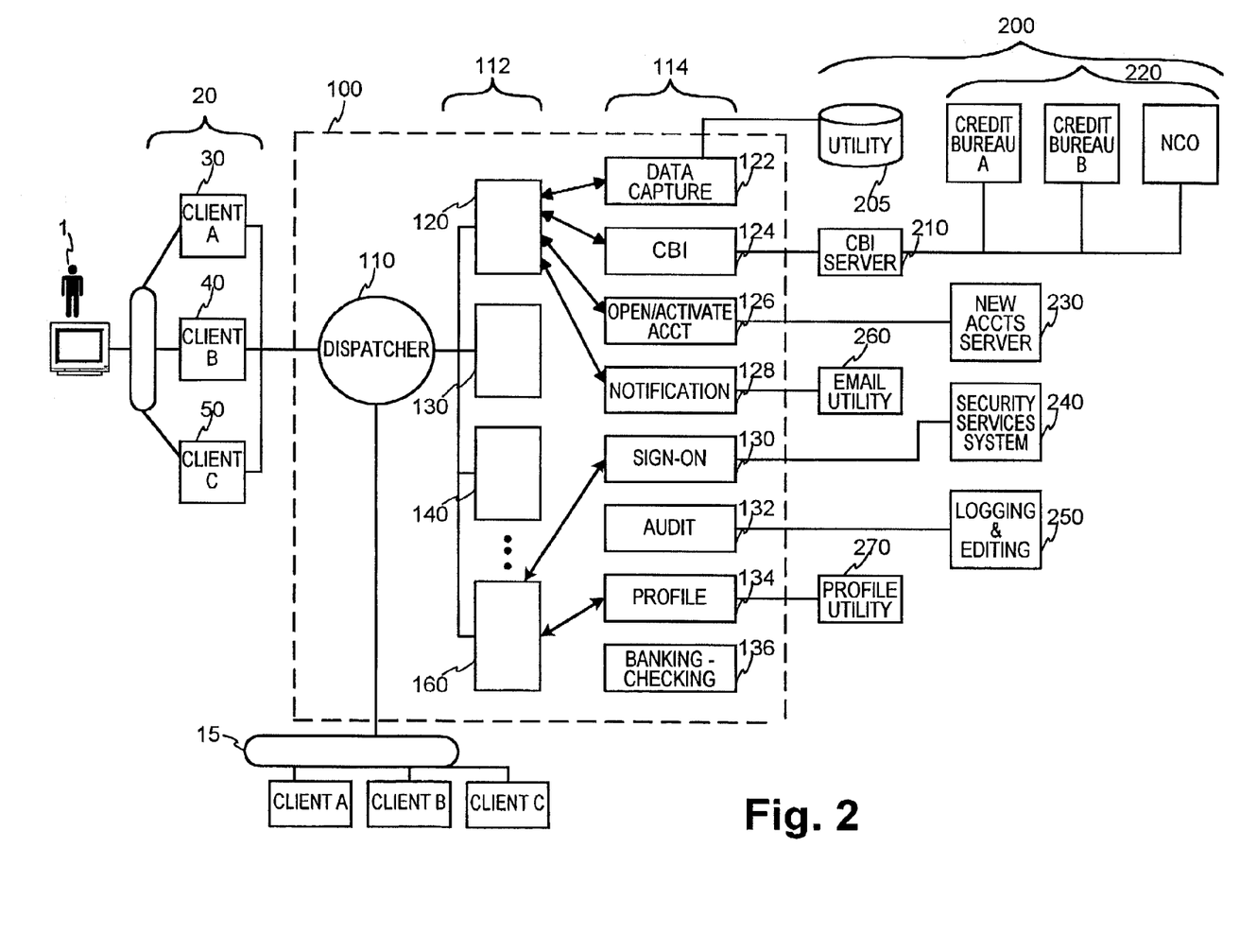
FIG. 2 illustrates an exemplary embodiment of the E-Acquisition system comprising a dispatcher, several Handlers, and several Workers.
Figure 3:
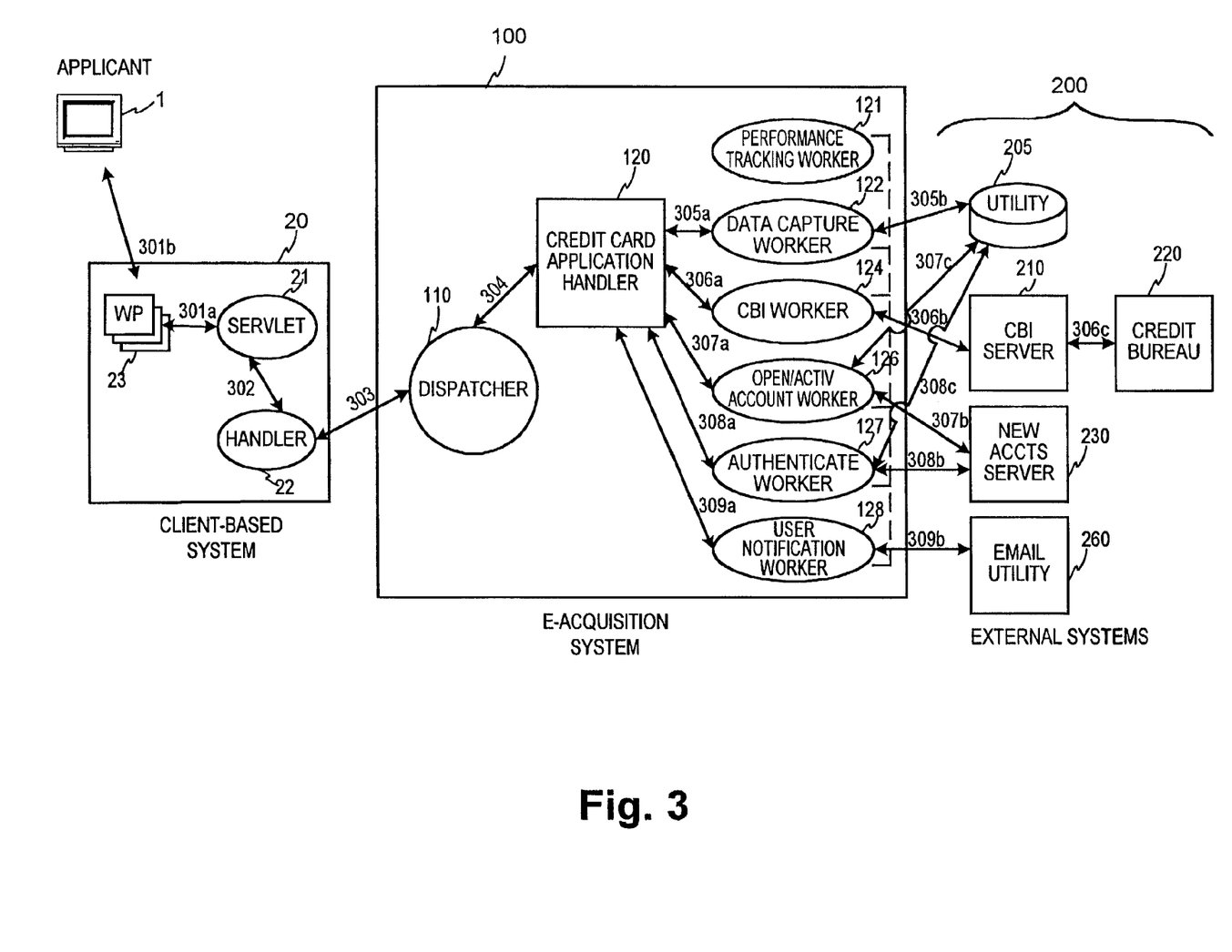
FIG. 3 is a schematic depicting an exemplary credit card application process of the present invention.

The present invention is described herein in terms of functional block components (FIGS. 1-2) and a schematic flow diagram (FIG. 3). It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, JavaScript, VBScript, COBOL, assembler, PERL, or the like, with the various algorithms being implemented with any combination of data structures, objects, processes, routines or other programming elements. The present may be configured and implemented, for example, utilizing the J2EE (Java 2 Platform, Enterprise Edition), CORBA and XML, or any other component based platform known to provide a multitiered distributed application model and the ability to reuse components. Further, it should be noted that the present invention may employ any number of conventional techniques for data transmission, signaling, data processing, network control, and the like. The following references, all of which are incorporated herein by reference, may be helpful in understanding known programming and communication protocols: (1) Deepak Alur, Core J2EE Patterns: Best Practices and Design Strategies, published by Prentice Hall (2001); (2) Richard Monson-Haefel, Enterprise JavaBeans, published by O'Reilly & Associates (3 ed. 2001); Gilber Held, Understanding Data Communications (1996); Dilip Naik, Internet Standards and Protocols (1998); and Java 2 Complete, various authors (Sybex 1999); the Object Management Group website at http://www.omg.org; and the Sun Microsystems JAVA website at http://www.sun.java.com/j2ee.

Figure 1:
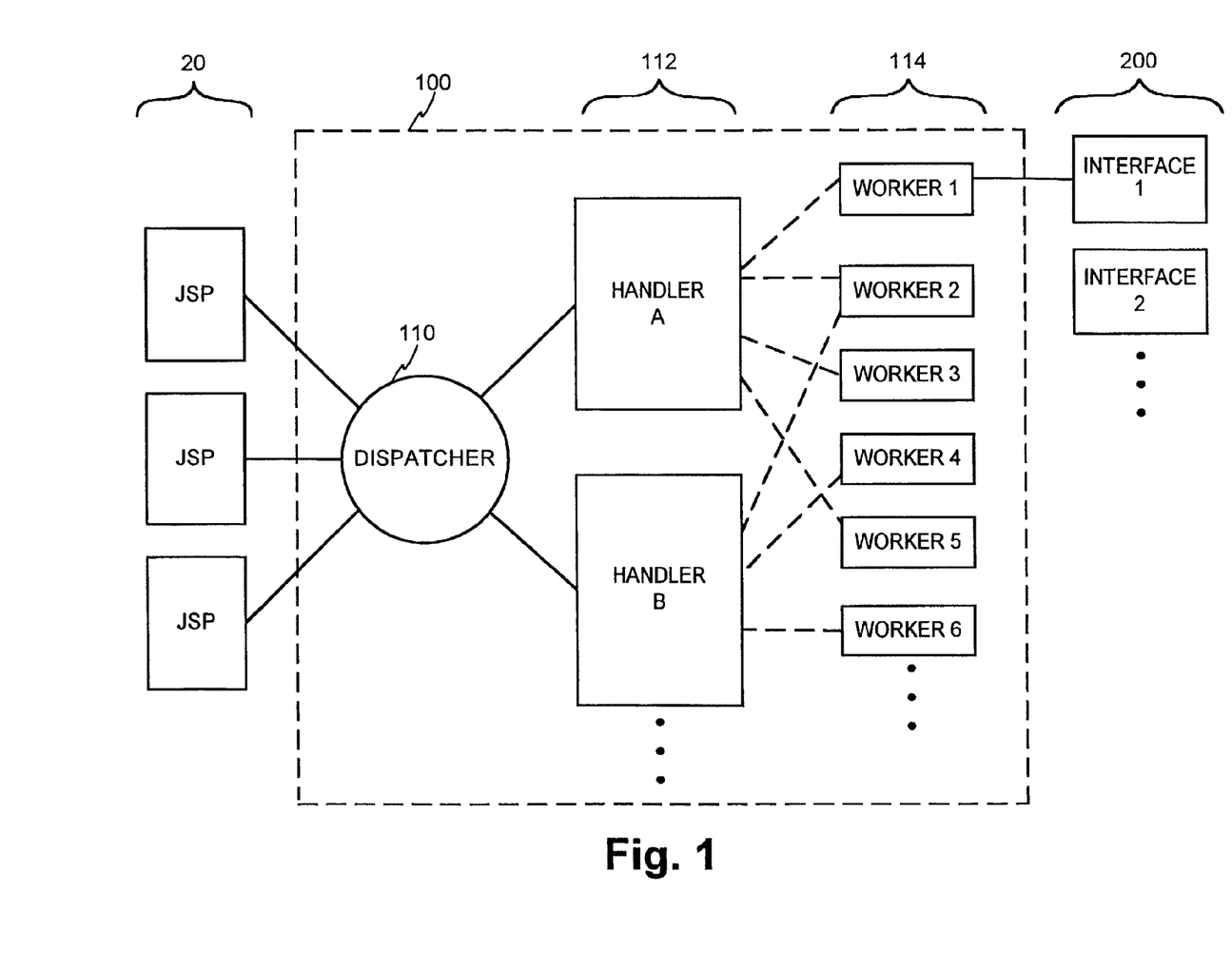
FIG. 1 illustrates a basic schematic overview of exemplary Handler and Worker components of an exemplary embodiment of the present invention.

FIGS. 1 and 2 generally illustrate the various components of an exemplary embodiment of the present invention. The E-Acquisition system 100 generally comprises a Dispatcher 110 for routing various client product or service event requests (e.g., application, operation or maintenance requests) to various Handlers 112. Handlers 112 employ client or function specific business logic by invoking, as needed, a number of Workers 114 to carry out the various steps appurtenant to the particular client application requirements. The Workers 114 are generally configured to access and communicate with various internal and external application servicing systems 200, which are accessed on an as-needed basis depending on the type of product or service event requested. The Handlers 112 and Workers 114 may co-exist on a single server or be located/operated on several servers. Furthermore, several different Handlers and/or different Workers may be on a single network or located throughout a distributed network.

To facilitate the application process, clients 20 may use existing Workers 114 or may add or contribute interfaces (i.e., Workers 114) to the Acquisition System 100. When a new Worker 114 is added by the client 20, the client 20 configures the Worker 114 to E-Acquisition system 100 standards. These new Workers 114 may then be incorporated into the E-Acquisition System 100 for subsequent re-use by other clients 20.

The E-Acquisition system 100, in an exemplary embodiment, is a Java-based implementation residing on Websphere 2.0.3 and/or Websphere 3.5 application servers. In an exemplary embodiment, where E-Acquisition system 100 does not have a direct web presence, it provides its clients with communication means for integrating applications to communicate with the E-Acquisition system 100. Protocols used for communication include HTML/HTTP, RMI, and/or the like. It should be appreciated, however, that the E-Acquisition system 100 may include various web servers, APIs, application servers, fulfillment engines, routers or other computing systems including a processor for processing digital data, memory devices coupled to said processor for storing digital data, an input digitizer coupled to the processor for inputting digital data, application programs stored in said memory and accessible by said processor for directing processing of digital data by said processor, a plurality of databases, said databases including client and/or applicant data, financial institution data and/or like that could be used in association with the present invention. It should be appreciated that communication among the applicant 1, the client 20 and/or E-Acquisition System 100 may be accomplished through any suitable communication means, such as, for example, a telephone network, intranet, internet, extranet, point of interaction device (point of sale device, personal digital assistant, cellular phone, electronic kiosk, etc.), online communications, offline communications, wireless communications, a dedicated or non-dedicated communication channel and/or the like.

More specifically, Handlers 112 are software modules designed to execute fulfillment logic to deliver the products or services desired. Handlers 112 are deployed, in an exemplary embodiment, as Java objects that reside in the context of the Dispatcher 110 process. Although Handlers 112 are generally application-specific implementations configured for the performance of specific performance logic associated with given products or services, standardized and reusable (built-in) handlers are contemplated. As such, because the business logic for many product and service fulfillment events are similar, Handlers may be configured by the E-Acquisition manager or client, to specific clients' needs, utilizing similar device structures, protocols and instruction sets. Handlers 112 receive event requests pertaining to a particular product or service from the Dispatcher 110, where distributed objects for known events forward the application data to the appropriate Worker. As shown in FIG. 2, an exemplary E-Acquisition system 100 comprises many product or service-specific Handlers (e.g., 120, 130, 140, 160), where, for example, Handler 120 is configured to facilitate the workflow of a credit card product; Handler 130 is configured to facilitate workflow for an online banking service; Handler 140 is configured to facilitate the workflow for investment or brokerage services. Although a Handler 112 is preferably configured to perform product or service-specific business logic, a Handler 112 may be configured to facilitate routinely-used processes, such as online authentication services (Handler 160). As such, several clients may utilize Handler 160 to authenticate their online users, where Handler 160 invokes Workers 130 and 134 to communicate with, for example, a Security Services System 240, and a user Profile Utility 270 and/or a Utility Database 205 to process user authentication requests.

Various Workers 114, as generally depicted in FIG. 1, are configured to perform tasks according to instructions from the Handlers 112. Each Worker 114 is a discrete unit of work that knows how to do a particular task well. Each are typically simplistic objects with encapsulated interfaces. As such, Workers 114 are generally reusable utility components that are dedicated to performing one or a limited number of specific functions, such as, for example, to capture data, check delinquent balance, interface with a credit bureau interface server and/or the like. Accordingly, separate Workers 114 may be configured to save data, to process data, to communicate with external applications, to open accounts, etc. Each Handler 112 typically uses several Workers 114 for carrying out the particular client instruction set. In other words, the Handler 112 invokes a series of Workers 114 to facilitate a given process. To facilitate specific tasks, Workers are designed to be transformed into remote objects (e.g., EJB, RMI, CORBA, JMS), when needed.

CBI (credit bureau interface) Worker 124, for example, is commonly invoked by various Handlers to communicate with a Credit Bureau Interface (CBI) server 210, which sends and receives data to and from one or more credit bureaus. In an exemplary embodiment, a CBI Worker 124 is configured to communicate with the CBI server 210, which in turn, communicates with credit bureaus and or credit bureau providers 220 such as Experian, TransUnion, and NCO. In another embodiment, another Worker, e.g., Experian Worker (not shown) is specifically configured to communicate directly with the credit bureaus without invoking the CBI Server 210. With respect to an embodiment utilizing the CBI Server 210, should a client need a utility to access and retrieve credit reports from one or more credit bureaus, the CBI Worker 124 from the E-Acquisition system 100 is accessed and invokes the CBI Server 210 to communicate with the various credit bureaus 220 to fulfill that request. Utilizing the reusable CBI Worker 124, the time, effort and expense of accessing credit bureaus is substantially reduced. Instead of each client developing, operating and maintaining a separate infrastructure for communicating with credit bureaus, each client can now access a single Worker to facilitate that event.

With respect to the CBI Server 210, the CBI Server 210 functions as a distributed credit bureau communication system, which is configured to allow multiple and possibly disparate credit bureau resources to be configured. New credit bureau sources are configured within the CBI Server 210, while the interface remains the same. As such, because a limited set of information is generally required by any credit bureau to process a decision, by providing a common interface, the CBI Server 210 is able to manage the mapping of the applicant data to the interface specific needs while isolating the client and allowing a quicker time to market. In operation, clients' requests are directed by any Handler, through the CBI Worker 124, to the CBI Server 210 configured as noted above to communicate with various credit bureau systems. As such, the CBI Worker 124 receives a request with relevant application data and a unique identifier. The CBI Worker 124 invokes the CBI Server 210, where the data for the particular product or service request is transmitted to the CBI Server 210 in a format that is natively defined by using, for example, Java Programming language constructs. The protocol of communication utilized by the CBI Server 210 may be, for example, RMI. The CBI Worker 124 generally processes the client requests to the CBI Server 210 and the various credit bureaus 220 as it receives them, where the CBI Server 210 is specially configured to communicate with specific credit bureaus in a manner recognized by the credit bureaus 220, e.g., MQ or TCP/IP. The request is then processed by the requested credit bureau 220, passed through the CBI Worker 124, and returned to Handler. Although the CBI Server 210 may be accessed by a CBI Worker 124 within the context of the E-Acquisition Server, it should be appreciated that the CBI Server 210 is not dependent upon the E-Acquisition System 100 and can be independently accessed via a remote method invocation by non-E-Acquisition clients. Accordingly, the CBI Server 210 can be accessed separately through the E-Acquisition System 100 or through systems outside the E-Acquisition framework via, for example, any suitably configured JAVA program.

Communication of data among and between the various components of this invention is accomplished using any suitable communication means, such as, for example, a telephone network, Intranet, Internet, an extranet, WAN, LAN, satellite or wireless communications, direct dial connection and/or the like. It will be appreciated that many applications of the present invention could be formulated.

The E-Acquisition system 100 and processes described in greater detail below facilitate particular business events for clients by using a standardized, yet customizable, data capture system and by applying various business rules according to the product or service requested. In other words, each client product or service may specify what data is captured. Further, the E-Acquisition system 100 provides substantially transparent and seamless integration with client systems, enabling faster time-to-market for new products and services because of the ability to integrate this existing E-Acquisition system 100 as a back-end office to existing or newly developed client systems. Although this system is primarily referenced with respect to product or service requests and application processes, it should be appreciated that this invention is not limited to "applying" for a product or service. As such, this invention also contemplates facilitating the general operation and maintenance of cardmember and user accounts. In other words, the E-Acquisition system 100 is also used by various clients for events other than just the "application process," such as for facilitating online authentication, online trading, membership banking, e-pay services, sweepstakes, insurance programs, loyalty programs, and the like. In short, this application facilitates any activity requiring the capture of data and doing something with it, including not only the application process, but also general operation and maintenance.

Exemplary embodiments of the E-Acquisition system 100 provide various product fulfillment services, such as a service for saving/retrieving application data to/from a database during real-time application processing; a facility for retrieving previously captured application data during deferred (batch) processing; detection of duplicate applications (e.g., identification, name, etc); event auditing/logging; various reporting options by category of product or service; services for accessing credit bureau systems; services for communicating product or service requests and account information to the client in a format acceptable by the client. Furthermore, this E-Acquisition system 100 is not a language-dependent platform; rather, the E-Acquisition system 100 is capable of accepting data from many different languages and in a variety of formats. In other words, this E-Acquisition system 100 is capable of accepting application data entered in most, if not all, spoken languages (e.g., English, Spanish, French, etc.). As such, this E-Acquisition system 100 is particularly useful for companies having a presence in multiple countries.

Turning now to an exemplary aspect of the present invention, as shown in FIG. 2, a client 20 generally develops product-specific webpages (e.g., 30, 40, 50) to gather appropriate applicant input and pass it to the E-Acquisition Dispatcher 110. From an applicant's perspective, an Applicant 1 applying online for a client's product or service such as a credit card account, for example, may communicate with the client, either directly or through the E-Acquisition system 100 over a computerized network via the Applicant/user's 1 web browser. As those skilled in the art will appreciate, an applicant's computer will typically include an operating system (e.g., Windows XP, NT, 95/98/2000, Linux, Solaris, etc.) as well as various conventional support software and drivers typically associated with computers. The applicant's computer can be in a home or business environment with access to a network. In an exemplary embodiment, access is through the Internet through a commercially-available web-browser software package.

In an exemplary embodiment, as shown in FIG. 3, the Applicant 1 initiates a request for a particular product or service by clicking on an appropriate "apply" button on his or her web browser. The apply button may be on an E-Acquisition website or routed to the E-Acquisition website via the client website. In any event, a Request Handler 22 residing within the client system 20 or an E-Acquisition Web Server, in response to the applicant's request, posts to the applicant's browser, a client-specific or a standardized form (webpage) 23 and the applicant 1 enters the appropriate personal and financial data into the appropriate fields on the client-based webpage, wherein the appropriate fields are generally determined by business rules for the particular client product (e.g., credit card account) requested.

When XML data is received and passed to the Dispatcher 110, the Dispatcher 110 passes the applicant data to the correct fulfillment Handler 112, where the handler interacts with various workers 114 to capture and process application data, and interface with internal and/or external systems 200 to fulfill the applicant's request. Throughout this process, data is captured and stored by the E-Acquisition system. An Applicant 1 that has already used this system may have a stored profile such that for subsequent product or service request, the applicant need not reenter previously entered information. Additionally, an applicant may partially complete an application in one online session and desire to finish the application in another online session. When this happens, to save application data, a Security Worker may be invoked to save data associated with a designated user ID to a user database (e.g., Database 205). An appropriate worker, e.g., Data Capture Worker 122, is also configured to retrieve from the Utility Database whatever data was previously stored. Thus, this "resume" feature allows applicants to complete an application in several different online sessions.

To facilitate the fulfillment process, an applicable Handler 112 retrieves the applicant's financial information, and compares this information with the appropriate client business rule, invokes appropriate Workers 114 to facilitate communication with appropriate interfaces to fulfill the event request. An exemplary online brokerage application Handler, via a CBI Worker 124 communicates with a CBI Server 210, to access a credit bureau service 220 to obtain an account decisioning or applicant's credit report. Based on this information, the Applicant's 1 request for a client product (e.g., credit card) may be either approved, denied or deferred. If approved, the E-Acquisition system 100 application server communicates, invoking an appropriate Worker, with a New Accounts system (e.g., credit card provider) to open an account. An account number and password may be returned to the applicant in a real-time environment and/or the client may then send the product to the applicant. In an exemplary embodiment, the account number and password is posted to applicant's web page, where confirmation may also be sent to the applicant's email address (previously captured by the user notification worker 128).

The present invention may be used for any product or service application acquisition event or any other system for acquiring application data, such as, for example, a facsimile transmission with, if necessary, subsequent scanning of data from the fax. Other events include, for example, an online brokerage account application offered by an online brokerage client. With this exemplary event, an applicant is able to apply for an online brokerage account by providing applicant data and, if approved, receiving a substantially instant (real-time) account setup and activation.

With reference to FIGS. 2 and 3, a more detailed description of an exemplary process for applying for a charge card is provided. As shown, the overall product application process involves an Applicant 1 applying for a card product, front-end client-based components 20 for interfacing with the Applicant 1, the backend E-Acquisition system 100, and various interface systems 200, which may be external to the E-Acquisition system. In general, the process is initiated when an Applicant 1 requests a product (e.g., credit card) from the client's website via an online request. The client systems 20 facilitate the process on the front end by posting the appropriate webpages (STEP 301a-b) in response to the Applicant's 1 event request (e.g., applying for a credit card). The client's webpages 23 are served to the applicant by Servlets 21. The Servlets 21 retrieve and forward the application data to a front-end Handler 22 (also known as a "request handler") (STEP 302). In an exemplary embodiment, an E-Acquisition call occurs each time the Applicant 1 selects the "submit" or "continue" button, where the information is captured and saved. As such, each time information is provided by the Applicant 1 and the submit button is selected, the Handler 22 formats and validates the application data and transmits that application data as, e.g., XML data, to the E-Acquisition System 100. The Dispatcher 110 recognizes the data as corresponding to a particular product or category and directs the communication to an appropriate Handler 120. In this example, where the Applicant 1 requested a credit card product, the client-based system 20 requests and receives from the Applicant 1 the appropriate application data. This data was ultimately forwarded, by the Dispatcher 110, to the Credit Card Application Handler 120 for data processing and product fulfillment.

In directing the business logic workflow, the Handler 120 invokes a series of Workers to process the data and fulfill the product request. As shown in FIG. 3, the data is first captured in a Utility Database 205 by invoking a Data Capture Worker 122 (STEP 305a) to communicate data to the Database 205 (305b). In this exemplary embodiment, when the required application data has been captured, the CBI Worker 124 is invoked (STEP 306a) to communicate with a CBI Server 210 (STEP 306b), which, in turn, communicates with the Credit Bureau 220 (STEP 306c). The Credit Bureau 220 processes the application data and returns the credit decisioning results to the Handler 120. Upon decisioning approval, the Handler 120 invokes the Open/Activate Account Worker 126 (STEP 307a) to communicate with a New Accounts Server 230 (STEP 307b) to open and activate an account corresponding to the requested product. Once the account is opened, the Worker 126, communicates with the Utility Database 205 (STEP 307c), to associate the account with the Applicant 1 and to record the account information (e.g., credit limit, account number, interest rate, etc.). Next, an Authentication Worker 127 is invoked (STEP 308a) to communicate with the New Accounts Server 230 (STEP 308b) to generate or determine Applicant's 1 authentication information, such as a username and password. This authentication information is again associated with the particular Applicant 1 in the Utility Database 205 (STEP 308c). Finally, with the account opened, activated and appropriate applicant authentication information recorded, the User Notification Worker 128 is invoked to post the account and authentication information to the Applicant 1 (STEP 309a), and, if desired, to communicate with an Email Utility (STEP 309b) to send Applicant 1 a confirmation email.

Throughout the above-described process, a Performance Tracking Worker 121 may be invoked by other Workers to track the performances of the Workers in completing particular tasks. As such, for example, the Performance Tracking Worker 121, in conjunction with the CBI Worker 124, may track the time elapsed between sending a request to a credit bureau and receiving a response. Likewise, the Performance Tracking Worker 121 may be invoked to determine the response time in capturing data and saving it to the Utility Database 205. As one can appreciate, the Performance Tracking Worker 121 may be invoked by a Worker or Handler, anytime the performance of a task or event is desired.

A further embodiment (not shown) of the present invention involves the integration of a Test Harness Handler into the E-Acquisition System. The Test Handler facilitates the management of issues surrounding system unavailability and browser "time-outs." As one skilled in online technology can appreciate, one of the problems encountered in developing and implementing a real-time application system, is system failure or system downtime. Toward this end, every client needs to assess E-Acquisition availability and interface availability. With the present invention system unavailability can occur in a number of ways: (1) the Dispatcher 110 may be down, (2) the needed Handler 112 may be down, (3) the requisite Workers 114 may be corrupted or down, (4) the interface systems 200 may be down, or because of heavy data throughput, one or more of the above systems may be unacceptably slow. If a client is not aware when a system component is down, the client will submit the product and/or service request to the E-Acquisition Handler, and only when the specific Worker (associated with the inoperative components) is invoked, will the client become aware of the problem. As such, client's will submit data to the E-Acquisition system and wait for a response. Only when a response is not forthcoming will the client be aware of the system failure—by this time, the applicant's browser has timed-out and the applicant, often in frustration, gives up on his or her online request.

One way to solve the above-described problem is to send a test message with every event request, where the product or service-specific Handler is configured to test component availability by sending test messages. This method, however, is resource-consuming and expensive. For example, since many interface systems 200 and Workers 114 are re-used, multiple clients sending test requests one after the other, will further slow down the product or service processing. Also, each time a credit bureau or NCO 220 is accessed, a fee is charged for this access. To solve this problem, a Test Handler is configured to periodically (e.g., every 15 minutes) verify that all systems are active before an event request is made. When a "test" is made, the results are then shared with all clients to enable clients to send product or service event requests—within a predefined time frame—without the need to send a separate test message. In an exemplary embodiment, the Test Handler is configured to check on the availability of any interface at any time; to report component availability to requesting clients; and to increase or decrease periodic testing depending of volume of product or service requests. This may be done, for example, using a test configuration file or by sending test event via a web page or other automated mechanism that provides a category, product or service identification and a test configuration number. An exemplary Test Handler will maintain two attributes for the interface: (1) Status (i.e., component up/down), and (2) last execution time.

The Test Harness is also configured to increase or decrease the testing frequency depending on the previous status report. That is, if the Test Handler returns a message that a particular component is down, the Test Handler may automatically increase testing frequency until the system becomes available once again. The Test Handler is also configured to be integrated with client "re-try" applications. If, for example, a client product request was terminated due to component unavailability, Product or service Handlers are typically designed to automatically retry the request. The Test Handler prevents multiple "re-try" attempts by first checking the component report or initiating a test request, prior to sending the "re-try." Also, the Test Handler, in addition to invoking Workers, to, for example, send a test request to the Credit Bureau Interface 210, a separate Performance Worker 121 may be configured to not only report on whether the component is up or down, but also, if the system is up and determine if it is processing efficiently. As such, using the Test Handler in conjunction with the Performance Worker, allows clients and/or the E-Acquisition system manager to schedule discretionary operations (e.g., system maintenance, upgrades, etc.) for optimum performance. In addition, it would be expected in an exemplary embodiment that when normal traffic is sent to Product Handlers 112, they would update the last execution time for the Test Handler—the net effect being the ability to "take credit" for a real-time data request and therefore prevent a test of the same system when traffic has occurred within the pre-defined test period (e.g., 15 minutes).

Additional exemplary embodiments of the present invention include a device and method to restrict duplicate application processing, to retry event requests in the event a previous attempt is unsuccessful, and to collect background information associated with an event request.

With respect to the device for restricting duplicate application processing, known-in-the-art fuzzy logic programming is employed to prevent the processing of applications with substantially similar data. For example, the present e-acquisition system may be configured to prevent multiple submissions by any single person. This is useful for clients such as credit card companies who do not want to issue multiple lines of credit to the same person. As such, applications with the same, or similar, application data my be rejected if the programming logic determines that the application relates to the same person.

With respect to the device and method for retrying event requests, it is desirable to facilitate processing within the e-acquisition system and to prevent manual processing of the event requests. Accordingly, the e-acquisition system is configured to retry event requests a predetermined number of times if a previous event request fails.

Oftentimes, a client may wish to track event request data or associate specific information with an event request. As such, an exemplary embodiment of the present invention is configured to collect background information and associate this data with the event request. The event request is processed through the e-acquisition system as discussed above, while passing the desired background information with the event request.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in exemplary online brokerage account application systems.

In compliance with the patent statutes, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

The invention claimed is:

1. A computer based acquisition system, comprising:
   a network interface communicating with a non-transitory memory;
   the memory communicating with a processor;
   the processor, when executing a computer program, is configured to execute a plurality of modules comprising a computerized client interface system, a dispatcher and a test handler;
   the computerized client interface system configured to accept a plurality of event requests from a plurality of clients; and
   the dispatcher configured to route each of the plurality of event requests to at least one of a plurality of handler systems, each handler system configured to invoke at least one of a plurality of worker utilities according to business logic for handling a respective event request, each worker utility configured to perform one or more tasks to fulfill the respective event request, wherein at least one of the plurality of clients is enabled to add a new worker utility and all of the plurality of handler systems are enabled to invoke any of the worker utilities, and wherein the new worker utility is configured by at least one of a corresponding client and one of the handler systems to be re-used by any one of the plurality of clients;
   the test handler configured to:
   determine, based upon a first event request, a subset of the plurality of handler systems and a subset of the plurality of worker utilities associated with the first event request, wherein the first request comprises a request for at least one of a product or a service;
   determine, at a predetermined testing time, a status of the subset of the handler systems and a status of the worker utilities to create a plurality of statuses;
   analyze the plurality of statuses based upon the first request and first business logic to determine a request readiness status, wherein the first business logic comprises information interrelating the first request and the subset of the plurality of handler systems and the subset of the plurality of worker utilities;
   determine, based at least in part on the plurality of statuses and the request readiness status, a time slot during which the plurality of clients are permitted to submit the first event request; and
   communicate, to the plurality of clients, the request readiness status and the time slot.

2. The system of claim 1, further comprising an application server on which the dispatcher, the handler systems and the worker utilities reside.

3. The system of claim 2, wherein the application server is a J2EE-compliant Java Application Server.

4. The system of claim 1, wherein the plurality of handler systems are software modules deployed as a Java Objects.

5. The system of claim 1, further comprising an interface, wherein the at least one worker utility is configured to perform a specific task by communicating with the interface.

6. The system of claim 5, wherein the interface is communicatively coupled to at least one of: a credit bureau, a database, a card authorization service, a general accounts system, and a new card service.

7. The system of claim 1, wherein at least one of the plurality of handler systems is configured to facilitate a new account application process.

8. The system of claim 1, wherein at least one of the plurality of handler systems is configured to execute fulfillment logic to deliver at least one of a product and a service.

9. The system of claim 1, wherein at least one of the plurality of handler systems is configured to facilitate an authentication of a user.

10. The system of claim 1, wherein at least one of the plurality of handler systems is configured to facilitate a sign-on process for online users.

11. The system of claim 1, wherein at least one of the plurality of handler systems is configured with communication protocols for communicating with the at least one worker utility.

12. The system of claim 1, wherein the at least one worker utility performs a discrete unit of work to perform a specific task.

13. The system of claim 1, wherein at least one of the plurality of event requests includes an event selected from a group of events including: online banking account set-up, credit bureau access, epay account set-up, brokerage account set-up, membership banking set-up, user authentication, electronic payment, savings account set-up, checking account setup, and rewards program setup.

14. The system of claim 1, wherein the at least one worker utility comprises:
    an email worker;
    a credit bureau interface worker;
    an application specific worker;
    a profile worker; and
    a data capture worker.

15. The system of claim 1, wherein the at least one worker utility is a credit bureau interface (CBI) worker.

16. The system of claim 15, wherein CBI worker is configured with suitable protocols for communicating with a CBI server, wherein the CBI server interfaces with at least one credit bureau.

17. The system of claim 1, further comprising a web server user interface configured to interact with the client interface system.

18. The system of claim 1, further comprising,
    the test handler further configured to:
    store the plurality of statuses, the request readiness status and a respective corresponding time that each status was; and
    adjust the predetermined testing time based on the request readiness status and the first business logic.

19. A computer-based method, comprising:
    receiving, by a test handler computer, a first event request routed by a dispatcher computer, wherein a client interface computer accepts a plurality of event requests from a plurality of clients, wherein the plurality of event requests comprises the first event request;

invoking, by a test handler computer, a worker utility computer according to business logic for handling the event request, wherein a worker utility computer performs one or more tasks to fulfill the event request, wherein the plurality of clients are enabled to add a new worker utility computer and the test handler computer is enabled to invoke any worker utility computer, and wherein the new worker utility computer is configured by the test handler computer to be re- used by the plurality of clients;

determining, by the test handler computer and based upon a first event request, that the test handler computer and the worker utility computer is associated with the first event request, wherein the first event request comprises a request for at least one of a product or a service;

determining, by the test handler computer, at a predetermined testing time, a status of the handler computer and a status of the worker utility computer to create a plurality of statuses;

analyzing, by the test handler computer, the plurality of statuses based upon the first event request and first business logic to determine a request readiness status, wherein the first business logic comprises information interrelating the first event request and the subset of the plurality of handler systems and the subset of the plurality of worker utilities;

determining, by the test handler computer and based at least in part on the plurality of statuses and the request readiness status, a time slot during which the plurality of clients are permitted to submit the first event request; and communicating, by the test handler computer and to the plurality of clients, the request readiness status and the time slot.

20. A non-transitory computer-readable medium having computer-executable instructions stored thereon that, if executed by a test handler computer, cause the test handler computer to perform operations comprising:
    receiving a first event request routed by a dispatcher computer, wherein a client interface computer accepts a plurality of event requests from a plurality of clients, wherein the plurality of event requests comprises the first event request;

invoking a worker utility computer according to business logic for handling the event request, wherein a worker utility computer performs one or more tasks to fulfill the event request, wherein the plurality of clients are enabled to add a new worker utility computer and the test handler computer is enabled to invoke any worker utility computer, and wherein the new worker utility computer is configured by the test handler computer to be re-used by the plurality of clients;

determining based upon a first event request, that the test handler computer and the worker utility computer is associated with the first event request, wherein the first event request comprises a request for at least one of a product or a service;

determining, at a predetermined testing time, a status of the handler computer and a status of the worker utility computer to create a plurality of statuses;

analyzing the plurality of statuses based upon the first event request and first business logic to determine a request readiness status, wherein the first business logic comprises information interrelating the first event request and the subset of the plurality of handler systems and the subset of the plurality of worker utilities;

determining, based at least in part on the plurality of statuses and the request readiness status, a time slot during which the plurality of clients are permitted to submit the first event request; and communicating, to the plurality of clients, the request readiness status and the time slot.

* * * * *